United States Patent
Dunne et al.

(10) Patent No.: US 9,374,401 B2
(45) Date of Patent: *Jun. 21, 2016

(54) COMMUNICATION TRAFFIC MANAGEMENT

(71) Applicant: International Business Machines Corporation, Armonk, NY (US)

(72) Inventors: Jonathan Dunne, Dungarvan (IE); James Patrick Galvin, Jr., Georgetown, KY (US); Patrick J. O'Sullivan, Ballsbridge (IE); Mark E. Wallace, Blackrock (IE)

(73) Assignee: International Business Machines Corporation, Armonk, NY (US)

( * ) Notice: Subject to any disclaimer, the term of this patent is extended or adjusted under 35 U.S.C. 154(b) by 150 days.

This patent is subject to a terminal disclaimer.

(21) Appl. No.: 13/897,912

(22) Filed: May 20, 2013

(65) Prior Publication Data

US 2014/0344357 A1 Nov. 20, 2014

(51) Int. Cl.
| | |
|---|---|
| *G06F 15/16* | (2006.01) |
| *H04L 29/06* | (2006.01) |
| *G06Q 10/10* | (2012.01) |
| *H04L 12/18* | (2006.01) |
| *G06F 12/00* | (2006.01) |

(52) U.S. Cl.
CPC ............ *H04L 65/4038* (2013.01); *G06Q 10/10* (2013.01); *H04L 12/1822* (2013.01)

(58) Field of Classification Search
USPC .......................... 709/204–205, 223–229, 250
See application file for complete search history.

(56) References Cited

U.S. PATENT DOCUMENTS

| | | | |
|---|---|---|---|
| 6,310,941 B1* | 10/2001 | Crutcher ........... | G06F 17/30873 370/352 |
| 6,567,813 B1* | 5/2003 | Zhu et al. ....................... | 707/802 |
| 6,687,234 B1* | 2/2004 | Shaffer et al. ................. | 370/260 |
| 6,850,985 B1* | 2/2005 | Giloi ....................... | G06F 3/038 709/230 |
| 7,080,157 B2 | 7/2006 | McCanne | |
| 7,353,255 B2* | 4/2008 | Acharya et al. ............... | 709/204 |
| 7,680,912 B1* | 3/2010 | McNabb ............... | H04L 12/185 709/223 |
| 8,243,905 B2* | 8/2012 | Jeong et al. .............. | 379/202.01 |
| 8,601,058 B2 | 12/2013 | Ahmad et al. | |
| 2007/0053363 A1* | 3/2007 | Chen ................... | H04L 12/5695 370/395.21 |
| 2007/0081452 A1* | 4/2007 | Walter .............. | H04L 29/06027 370/229 |
| 2015/0312519 A1 | 10/2015 | Cicic et al. | |

OTHER PUBLICATIONS

Tostes ribeiro, Anna Izabel; J; Storck, Carlos R; Duarte-figueiredo, Fátima De; L; P, Telecommunication Systems 45.4 (Dec. 2010): 261-274.; Springer Science+Business Media, LLC 2010 ISSN: 10184864.*

* cited by examiner

*Primary Examiner* — Zarni Maung
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and computing system is provided for managing communication traffic relaying in a multiparty communication session. In an implementation, a method may include receiving a request from a first computing device to join a multiparty communication session. The method may also include associating the first computing device with a second computing device for the multiparty communication session, the second computing device participating in the multiparty communication session via a multipoint control unit. The method may further include relaying communication traffic for the multiparty communication session from the multipoint control unit to the first computing device by the second computing device.

13 Claims, 6 Drawing Sheets

COMMUNICATION TRAFFIC MANAGEMENT

TECHNICAL FIELD

The present disclosure generally relates to multiparty communication systems, and more particularly relates to managing communication traffic relaying for multiparty communication systems.

BACKGROUND

Various collaboration systems exist for enabling individuals to engage in collaborate activities, such as working together on projects, sharing information, and the like. Such collaboration systems can be particularly useful in allowing geographically dispersed individuals to interact with one another. Using different, or multi-functional, collaboration systems, individuals who are geographically remote from one another may, for example, engage in common work projects, for example, using online team work spaces, participate in interactive discussions, for example, using teleconferencing or videoconferencing systems, and engage in meetings, for example, using electronic meeting systems that allow for presentations, lectures, seminars, and the like.

SUMMARY OF DISCLOSURE

According to an implementation, a computer-implemented method may include receiving, by one or more processors, a request from a first computing device to join a multiparty communication session. The method may also include associating, by the one or more processors, the first computing device with a second computing device for the multiparty communication session. The second computing device may be participating in the multiparty communication session via a multipoint control unit. The method may further include relaying communication traffic for the multiparty communication session from the multipoint control unit to the first computing device by the second computing device.

One or more of the following features may be included. The method may also include analyzing a network quality of service factor for a network connection between the first computing device and the multipoint control unit. The method may also include analyzing a network quality of service factor for a network connection between the first computing device and the multipoint control unit via the second computing device. Associating the first computing device with the second computing device may be in response to identifying a preferred network quality of service criteria for the network connection between the first computing device and the multipoint control unit via the second computing device. The method may also include determining a network quality of service requirement of the first computing device. The method may include relaying communication traffic for the multiparty communication session from the first computing device to the multipoint control unit by the second computing device.

The method may also include identifying a change in the network quality of service factor. The method may further include un-associating the first computing device with the second computing device for relaying communication traffic from the multipoint control unit. The method may include associating the first computing device with a third computing device for the multiparty communication session. The third computing device may be participating in the multiparty communication session via the multipoint control unit. Communication traffic for the multiparty communication session may be relayed from the multipoint control unit to the first computing device by the third computing device. The method may also include associating the first computing device directly with the multipoint control unit for the multiparty communication session. Communication traffic for the multiparty communication session may be relayed from the multipoint control unit directly to the first computing device.

According to another implementation, a computer program product may include a computer readable medium having a plurality of instructions stored on it. When executed by a processor, the instructions may cause the processor to perform operations including receiving a request from a first computing device to join a multiparty communication session. Instruction may also be included for associating the first computing device with a second computing device for the multiparty communication session. The second computing device may be participating in the multiparty communication session via a multipoint control unit. Instructions may also be included for relaying communication traffic for the multiparty communication session from the multipoint control unit to the first computing device by the second computing device.

One or more of the following features may be included. Instructions may also be included for analyzing a network quality of service factor for a network connection between the first computing device and the multipoint control unit. Instructions may be included for analyzing a network quality of service factor for a network connection between the first computing device and the multipoint control unit via the second computing device. Associating the first computing device with the second computing device may be in response to identifying a preferred network quality of service criteria for the network connection between the first computing device and the multipoint control unit via the second computing device. Instructions may be included for determining a network quality of service requirement of the first computing device. Communication traffic for the multiparty communication session may be relayed from the first computing device to the multipoint control unit by the second computing device.

Instructions may be included for identifying a change in the network quality of service factor. The first computing device may be un-associated with the second computing device for relaying communication traffic from the multipoint control unit. Instructions may be included for associating the first computing device with a third computing device for the multiparty communication session. The third computing device may be participating in the multiparty communication session via the multipoint control unit. Communication traffic for the multiparty communication session may be relayed from the multipoint control unit to the first computing device by the third computing device. Instructions may be included for associating the first computing device directly with the multipoint control unit for the multiparty communication session. Communication traffic for the multiparty communication session may be relayed from the multipoint control unit directly to the first computing device.

According to yet another implementation, a computing system includes at least one processor device and at least one memory architecture coupled with the at least one processor device. The at least one processor device may be configured for receiving a request from a first computing device to join a multiparty communication session. The at least one processor may also be configured for associating the first computing device with a second computing device for the multiparty communication session. The second computing device may be participating in the multiparty communication session via a multipoint control unit. The at least one processor may further be configured for relaying communication traffic for the multiparty communication session from the multipoint control unit to the first computing device by the second computing device.

One or more of the following features may be included. The at least one processor may be further configured for analyzing a network quality of service factor for a network connection between the first computing device and the multipoint control unit. The at least one processor may also be configured for analyzing a network quality of service factor for a network connection between the first computing device and the multipoint control unit via the second computing device. Associating the first computing device with the second computing device may be in response to identifying a preferred network quality of service criteria for the network connection between the first computing device and the multipoint control unit via the second computing device. The at least one processor may be further configured for relaying communication traffic for the multiparty communication session from the first computing device to the multipoint control unit by the second computing device.

The at least one processor may be further configured for identifying a change in the network quality of service factor. The first computing device may be un-associated with the second computing device for relaying communication traffic from the multipoint control unit. The at least one processor may be further configured for associating the first computing device with a third computing device for the multiparty communication session. The third computing device may be participating in the multiparty communication session via the multipoint control unit. Communication traffic for the multiparty communication session may be relayed from the multipoint control unit to the first computing device by the third computing device. The at least one processor may be further configured for associating the first computing device directly with the multipoint control unit for the multiparty communication session. Communication traffic for the multiparty communication session may be relayed from the multipoint control unit directly to the first computing device.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Multiple individuals may often engage in a common communication sessions, for example, to discuss topics of common interest between individuals who may not be in the same location, and therefore, not able to meet in person. For example, many business discussions may require input form multiple individuals, and/or it may be desirable that multiple individuals be privy the discussions. Many communication systems are available that may allow multiple individuals in different locations to engage in audio and/or video conferences. Traffic for the communication session (e.g., audio and/or video data streams associated with the communication session) may be managed by devices, such as multipoint control units, which may allow all of the individuals involved in a multiparty communication session to receive traffic from all of the other individuals in a generally synchronous manner.

The quality of the communication session can be effected by a variety of network conditions. For example, one or more of the individuals participating the communication session may experience less desirable network conditions between the individual and the multipoint control unit that is managing the communication session traffic. For example, the multipoint control unit may be geographically remote from several of the participants who may be commonly located relative to one another, which may give rise to increased latency, packet loss, and the like. As such, the group of commonly located participants may all experience relatively poor call quality for the communication session. In some embodiments, issues associated with multiple individuals experiencing less desirable network conditions with the multipoint control unit may be at least partially mitigated by utilizing one or more of the participants of the communication session as a relay between those participants and the multipoint control unit. As such, rather than each of participants experiencing less desirable network conditions with the multipoint control unit (e.g., which may compound the degraded quality of the communication session), the group of participants may pass traffic to and from another participant, who may in turn forward the traffic to and from the multipoint control unit, e.g., which may forward traffic to and from other participants. As such, the communication session may be subject to fewer low quality network conditions, thereby increasing the overall quality of the communication session.

Figure 1:
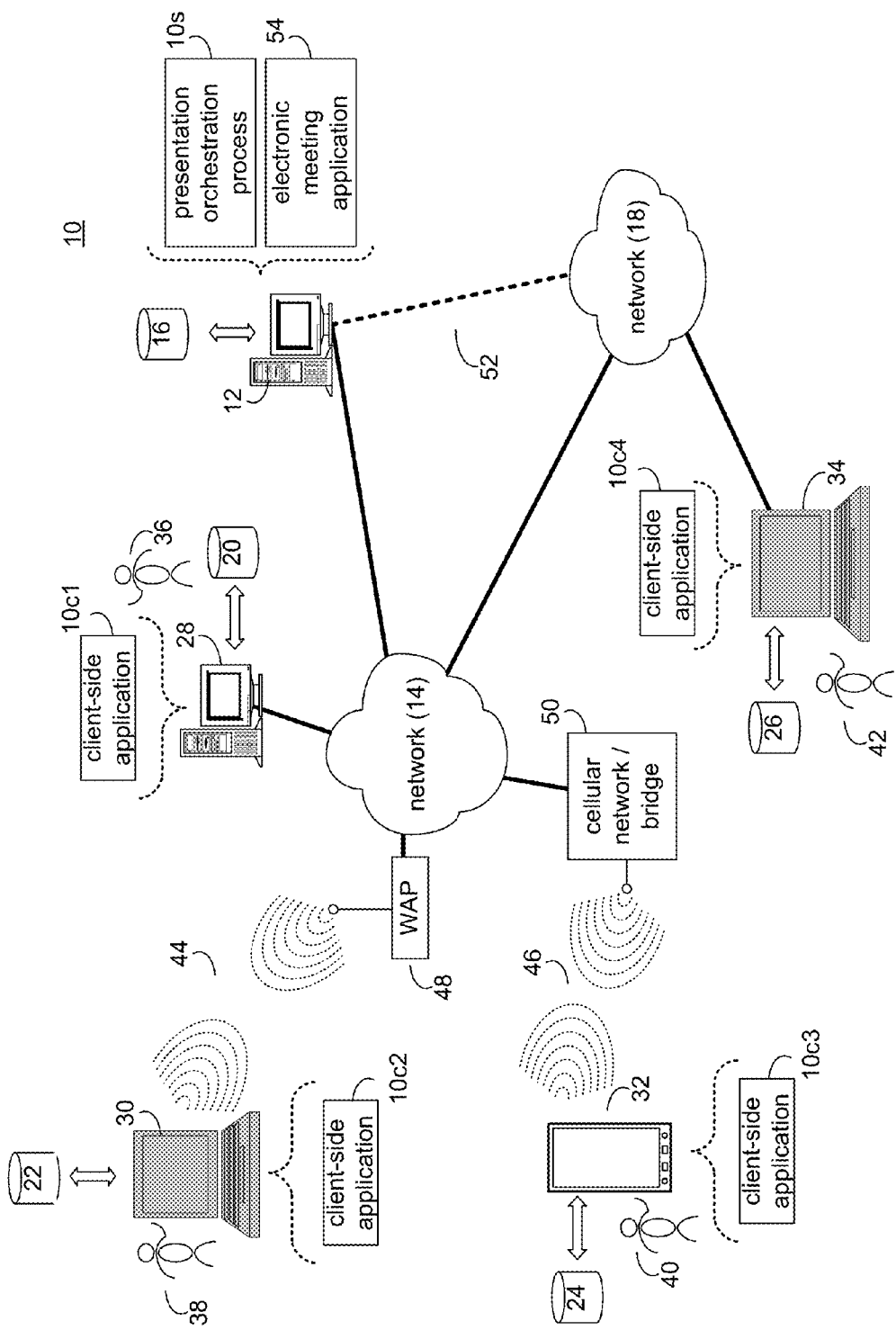
FIG. 1 is a diagrammatic view of a distributed computing network including a computing device that executes a relay process according to an implementation of the present disclosure.

Referring to FIG. 1, there is shown relay process 10. For the following discussion, it is intended to be understood that relay process 10 may be implemented in a variety of ways. For example, relay process 10 may be implemented as a server-side process, a client-side process, or a server-side/client-side process.

For example, relay process 10 may be implemented as a purely server-side process via relay process 10s. Alternatively, relay process 10 may be implemented as a purely client-side process via one or more of client-side application 10c1, client-side application 10c2, client-side application 10c3, and client-side application 10c4. Alternatively still, relay process 10 may be implemented as a server-side/client-side process via screen relay process 10s in combination with one or more of client-side application 10c1, client-side application 10c2, client-side application 10c3, and client-side application 10c4. In such an example, at least a portion of the functionality of relay process 10 may be performed by relay process 10s and at least a portion of the functionality of relay process 10 may be performed by one or more of client-side application 10c1, 10c2, 10c3, and 10c3.

Accordingly, relay process 10 as used in this disclosure may include any combination of relay process 10s, client-side application 10c1, client-side application 10c2, client-side application 10c3, and client-side application 10c4.

Figure 2:
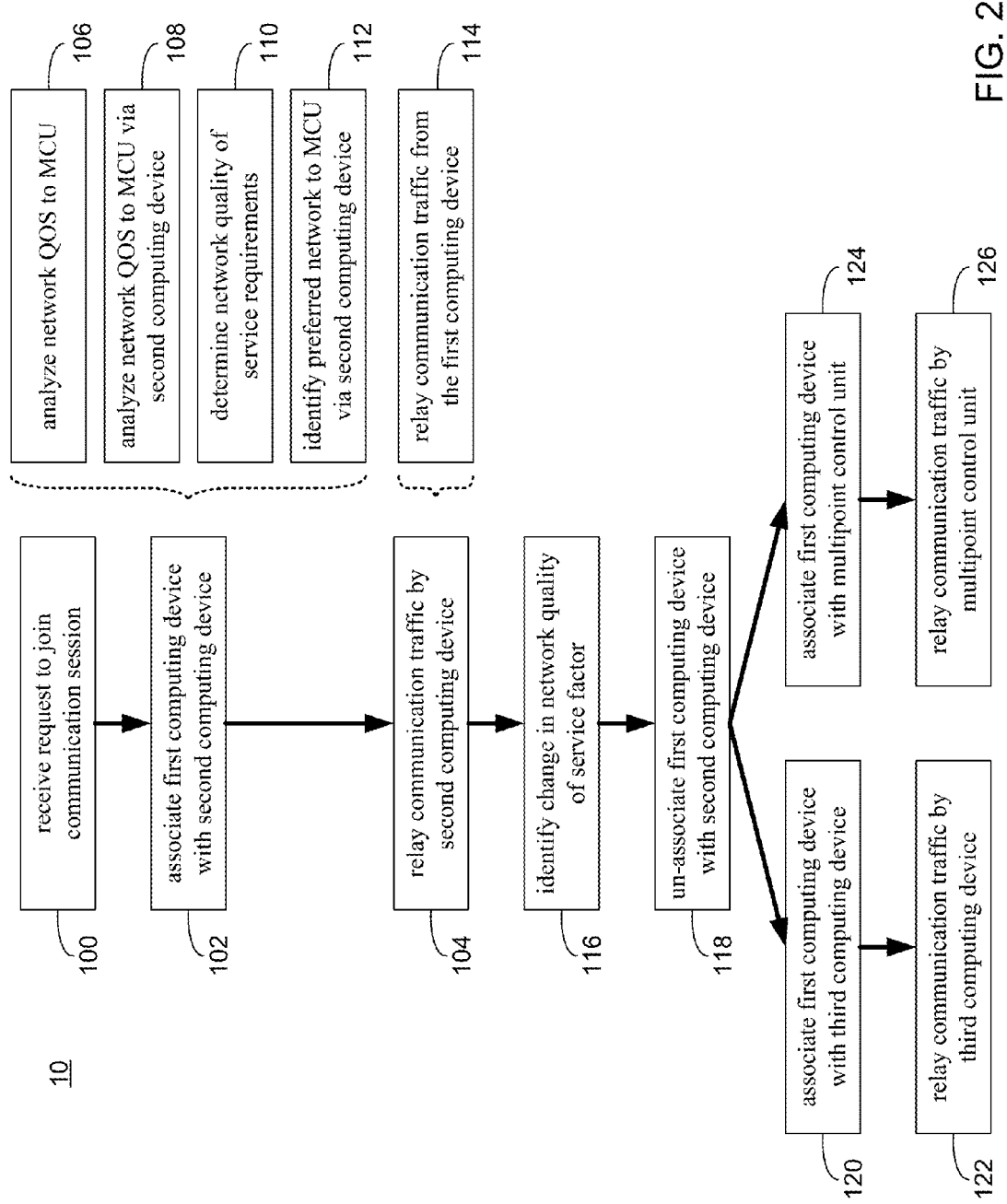
FIG. 2 is a flowchart of the relay process of FIG. 1, according to an implementation of the present disclosure.

Referring also to FIG. 2, and as will be discussed in greater detail below, relay process 10 may receive 100 a request from a first computing device to join a multiparty communication session. Relay process 10 may also associate 102 the first computing device with a second computing device for the multiparty communication session. The second computing device may be participating in the multiparty communication session via a multipoint control unit. Relay process 10 may further relay 104 communication traffic for the multiparty communication session from the multipoint control unit to the first computing device by the second computing device.

Relay process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of relay process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a voice over IP application, a video over IP application, a soft-phone application, a video conferencing application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access relay process 10 directly through network 14 or through secondary network 18. Further, screen capture process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, relay process 10 may communicate with, interact with, and/or include a component or module of a communication application (e.g., communication application 54). As is generally known, a communication application (e.g., communication application 54) may generally facilitate audio and/or video communications between multiple parties. For example, communication application 54 may facilitate voice over IP and/or video over IP communications between a plurality of users. In some embodiments, communication application may include, and/or may interact with, for example, an electronic meeting application, a web conferencing application, or a similar application. In some embodiments, communication application 54 may act as a conference manager. As such, communication application 54, for example, set-up and manage communications between multiple users. For example, communication application may allow users to join a communication session (e.g., by authenticating dial-in credentials) and the like. An example of communication application 54 may include, but is not limited to, Lotus® Sametime®. (Lotus and Sametime are registered trademarks of International Business Machine Corporation in the United States, other countries, or both).

In an embodiment, the instruction sets and subroutines of communication application 54 may be stored, e.g., on storage device 16 associated with server computer 12, which executes communication application 54, and/or another suitable storage device. Further, users (e.g., one or more of users 36, 38, 40, 42) may access communication application 54 in order to participate in a communication session (e.g., multiparty communication session, which may in some embodiments be a component of an electronic meeting or web conference). The users may access communication application 54 via one or more suitable applications, such as client side applications 10c1-10c4 (e.g., which may include a voice over IP client application, a video over IP client application, a client electronic meeting application, a web browser, or another application) and/or via a different application (not shown). As generally discussed above, a portion and/or all of the functionality of relay process 10 may be provided by one or more of client side applications 10c1-10c4. For example, in some embodiments relay process 10 (and/or client-side functionality of relay process 10) may be included within and/or interactive with client-side applications 10c1-10c4, which may include client side communication applications, web browsers, or another application. Various additional/alternative configurations may be equally utilized.

In some embodiments, relay process 10 may communicate with, be includes as a component of, and/or otherwise interact with a multipoint control unit (MCU) 56. In general, a multipoint control unit may be a device, process, or application that may manage communication traffic and/or streams of communication data associated with a multiparty communication session, such as a multiparty audio and/or video conference call. For example, a multipoint control unit may include a device used to bridge audio and/or videoconferencing connections. In some embodiments, a multipoint control unit may be an endpoint on a network that may provide the capability for three or more terminals and gateways to participate in a multipoint conference. For the purpose of simplicity of illustration, multipoint control unit 56 has been shown collocated on server 12. However, in some embodiments the multipoint control unit may not be collocated with communication application 54 and/or relay process 10. Further, in some embodiments, the multipoint control unit may be embodied in a discreet hardware instantiation. Various additional and/or alternative implementations may be utilized.

As generally discussed above with reference to FIG. 2, relay process 10 may receive 100 a request from a first computing device to join a multiparty communication session. Relay process 10 may also associate 102 the first computing device with a second computing device for the multiparty communication session. The second computing device may be participating in the multiparty communication session via a multipoint control unit. Relay process 10 may further relay 104 communication traffic for the multiparty communication session from the multipoint control unit to the first computing device by the second computing device. Accordingly, in an embodiment, relay process 10 may facilitate a communication session utilizing a combination of relaying clients and multipoint control units to forward communication traffic to and from all of the participants in the multiparty communication session.

Figure 3:
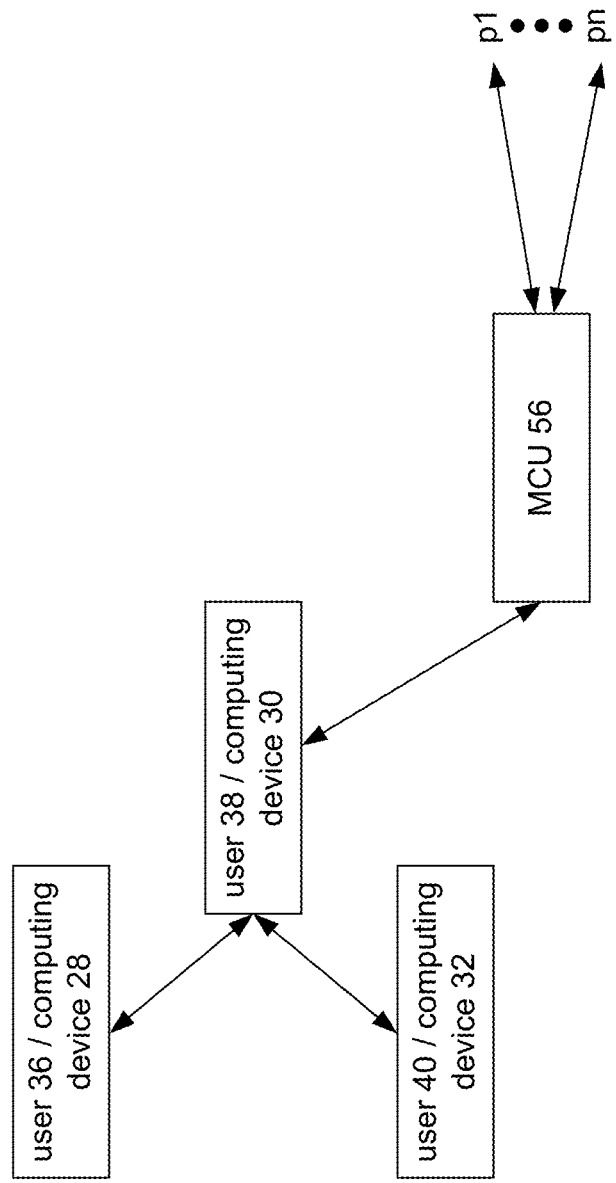
FIG. 3 is diagrammatic representation of an example relay process of FIG. 1, according to an implementation of the present disclosure.

For example, assume that a multiparty communication session is desired between a number of participants. Examples of a multiparty communication session may include, for example, an audio conference call, a video conference call, an electronic meeting or web conference having a multiparty audio and/or video component, or other such multiparty communication. Referring also to FIG. 3, for the purpose of illustration, in an example embodiment a first group of participants (e.g., users 36, 38, 40) may be generally collocated and one or more other participants (e.g., p1 through pn) who may be remotely located relative to the first group of participants. The first group of participants (i.e., the respective computing devices associated with each participant in the first group of participants) may be generally collocated in terms of network association. For example each of users 36, 38, 40 may be associated with a common network, and/or may be associated with a similar portion of a larger network. The other participants may be associated with one or more other networks and/or portions of networks. Further, in an embodiment a multipoint control unit (e.g., multipoint control unit 56), which may manage at least a portion of the communication session traffic between the participants of the communication session, may be associated with the same network as participants p1 through pn, and/or with another network.

Relay process 10 may receive 100 a request from a first computing device to join a multiparty communication session. For example, user 36 may request to join the communication session, e.g., using computing device 28. For example, using computing device 28, user 36 may request to join the communication session, e.g., by providing communication application 54 with appropriate dial-in credentials, or the like. Relay process 10 (either directly or in conjunction with communication application 54 and/or another application may receive 100 the request from computing device 28 for user 36 to join the communication session.

In an embodiment, relay process 10 may analyze 106 a network quality of service factor for a network connection between the first computing device and the multipoint control unit. For example, relay process 10 may determine what multipoint control units may be available for managing communication session traffic associated with the multiparty communication session. Consistent with the illustrated example, multipoint control unit 56 may be available for managing communication session traffic. In some embodiments, more than one multipoint control unit may be available for managing communication session traffic. In an embodiment, analyzing 106 a network quality of service factor for the network connection between the first computing device (e.g., computing device 28 associated with user 36) may include determining a network quality between computing device 28 and multipoint control unit 56. The network quality may consider aspects such as latency, packet loss, jitter, bandwidth, etc., which may adversely impact quality of service between computing device 28 and multipoint control unit 56.

Relay process 10 may also analyze 108 a network quality of service factor for a network connection between the first computing device and the multipoint control unit via the second computing device. For example, relay process 10 may identify other computing devices that may have already joined the communication session that may serve as a relay for communication traffic between computing device 28 and multipoint control unit 56. For example, prior to user 36 requesting to join the communication session, user 38 may have already joined the communication session using computing device 38. Accordingly, relay process 10 may identify computing device 30 as a potential relay for communication traffic between computing device 28 and multipoint control unit 56. Relay process 10 may similarly identify any other computing devices associated with the multiparty communication session which may potentially serve as a relay for communication traffic.

Relay process 10 may analyze 108 a network quality of service factor for a network connection between the first computing device and the multipoint control unit via the second computing device. For example, continuing with the above-example in which computing device 30 may have joined the multiparty communication session prior to relay process 10 receiving 100 the request from computing de vice 28 to join the multiparty communication session, relay process 10 may analyze 108 a network quality of service factor for a network connection between computing device 28 and multipoint control unit 56 via computing device 30. In an embodiment, the network quality of service factor may consider aspects such as latency, packet loss, jitter, bandwidth, etc., which may adversely impact quality of service between computing device 28 and multipoint control unit 56 via computing device 30.

Consistent with the foregoing, analyzing 108 the network quality of service factor for a network connection between computing device 28 and multipoint control unit 56 via computing device 30 may including analyzing network factors between computing device 28 and computing device 30. Further analyzing 108 network quality of service may also include analyzing network factors between computing device 30 and multipoint control unit 56. Further, analyzing 108 quality of service factors may also include determining attributes associated with computing device 30. For example, relay process may determine attributes associated with computing device 30 such as current CPU load, network performance (e.g., which may include networking hardware associated with computing device 30). For example, notwithstanding any quality of service factors associated with the network between computing device 28 and computing device 30, and between computing device 30 and multipoint control unit 56, a relatively high CPU load being experienced by computing device 30 may adversely impact the ability of computing device 30 to relay communication traffic between multipoint control unit 56 and computing device 28. Similarly, networking attributes (such as an obsolete or poorly functioning networking adapter, the number of computing devices associated with the second computer for relaying communication traffic, etc.) may also adversely impact the ability of computing device 30 to relay communication traffic between multipoint control unit and computing device 28. In some embodiments, a computing device may be requested to satisfy certain requirements and/or meet certain threshold requirements, e.g., to prevent poor quality of service, in order to be considered as a potential relay for communication traffic.

In an embodiment, each computing device associated with multiparty communication session may transmit status information (e.g., which may include current CPU load, network performance of the computing device, etc.) to relay process 10. In some embodiments, each computing device associated with the multiparty communication session may transmit the status information in response to a request from relay process (and/or from another process or application), and/or may proactively transmit the status information (e.g., as part of requesting to join the multiparty communication session, etc.). In an embodiment, e.g., in which relay process 10 may include be a client-side process and/or include a client-side component (e.g., in the form of client applications 10c1 through 10c4, etc.), computing devices associated with the multiparty communication session may communicate with one another, e.g., to analyze 108 network quality of service factors in a peer-to-peer paradigm.

Relay process 10 may also determine 110 a network quality of service requirement of the first computing device. In some embodiments, the first computing device, and/or an operator of the first computing device may have one or more associated attributes that may require a particular quality of service and/or a particular minimum quality of service. The quality of service requirements may be based on, for example, a role of the operator of the first computing device with respect to the multiparty communication session. For example, user 36 may not expect to have an active role in the multiparty communication session, but rather only to be a passive listener. In such a situation, the computing device 28 (operated by user 36) may have relatively low quality of service requirements (e.g., only requiring sufficient incoming audio and/or video to understand the substance of the multiparty communication session). However, if user 36 expects to have an active role in the multiparty communication session, computing device 28 may require a relatively higher quality of service, such that computing device may be capable of bidirectional audio and/or video that is of a sufficient quality to permit adequate consumption by all of the participants of the multiparty communication session.

Relay process 10 may determine 110 a network quality of service requirement of the first computing device based on, at least in part, one or more explicit and/or implicit cues. For example, a scheduling itinerary associated with the multiparty communication session may include a role designator associated with each of the participants and/or associated with participants expected to have a particular (e.g., active) role in the multiparty communication session. Similarly, a role designation may be required by the participant as part of joining the multiparty communication session. A hierarchical position associated with a participant may provide an implicit cue by which relay process 10 may determine 110 a network quality of service requirement for the first computing device. For example, assume that user 36 is indicated as being the lead developer of a software product that is the topic of the multiparty communication session (e.g., which may be indicated by an organization chart, documentation associated with the software product and/or a scheduling itinerary for the multiparty communication session, etc.). As such, it may be anticipated that computing device 28 may require a relatively high quality of service, as user 36 may be an active participant in the multiparty communication session. Various additional and/or alternative explicit and/or implicit information may be utilized to determine 110 a network quality of service requirement for the first computing device. In some embodiments, in the absence of an indicator of a different quality of service, the first computing device may be determined 110 to have a default quality of service requirement.

Relay process 10 may also associate 102 the first computing device with a second computing device for the multiparty communication session. As discussed above, the second computing device may be participating in the multiparty communication session via a multipoint control unit. Accordingly, the first computing device may be associated with the second computing device as a relaying computing device for communication traffic for the multiparty communication session. Continuing with the above-example, computing device 28 may be associated with computing device 30, in which computing device 30 may be a relaying computing device for computing device 28 for the purpose of the multiparty communication session. In an embodiment, associating 102 the first computing device with the second computing device may be in response to identifying 112 a preferred network quality of service criteria for the network connection between the first computing device and the multipoint control unit via the second computing device. That is, for example, associating 102 the first computing device with the second computing device may be in response to identifying 112 that network quality of service between the first computing device and the multipoint control unit via the second computing device results in preferred network quality of service (either for the first computing device and/or for the multiparty communication session as a whole) as compared to a network quality of service between the first computing device and the multipoint control unit directly. For example the combined quality of service resulting from the network connection between the first computing device and the second computing device and between the second computing device and the multipoint control unit may be superior to the network connection between the first computing device and the multipoint control unit directly (e.g., by virtue of a higher quality of service network connection between the second computing device and the multipoint control unit, etc.). In some embodiments, a preferred network quality of service criteria may be identified 112 from the network connection between the first computing device and the multipoint control unit via the second computing device, for example, by eliminating additional relatively low quality of service network connections from the multiparty communication sessions, thereby improving an aggregate quality of service of the multiparty communication session. By connecting the first computing device to the multipoint control unit via the second computing device, a relatively poor quality of service connection may be eliminated from the multiparty communication session. For example, rather than each of the first computing device and the second computing device having a separate relatively low quality of service connection with the multipoint control unit, only a single connection with the multipoint control unit (e.g., between the multipoint control unit and the second computing device) may be established. As such, potentially problematic connections with the multipoint control unit may be reduced.

Relay process 10 may further relay 104 communication traffic for the multiparty communication session from the multipoint control unit to the first computing device by the second computing device. For example, communication traffic for the multiparty communication session may be transmitted to the second computing device (as well as to other computing devices associated with the multiparty communication session) from multipoint control unit 56. Further, the communication traffic for the communication session received by the second computing device from the multipoint control unit may be forwarded from the second computing device to the first computing device. Accordingly, the first computing device may receive the communication traffic for the multiparty communication session.

For example, in the illustrated embodiment of FIG. 3, communication traffic generated by a participant of the multiparty communication session (e.g., by participant p1) may be transmitted to multipoint control unit 56, and may be forwarded by multipoint control unit 56 to the other participants of the multiparty communication session (e.g., including computing device 30, but not computing device 28). Further, the communication traffic received by computing device 30 from multipoint control unit 56 may be relayed 104 from computing device 30 to computing device 28. Further, in some embodiments, computing device 30 may serve as a relay for multiple other participants (via their respective computing devices) of the multiparty communication session. For example, as shown, another computing device (e.g., computing device 32) may be associated with computing device 30 for the multiparty communication session in a manner similar to computing device 28 (e.g., such that relay process 10 may relay 104 communication traffic from multipoint control unit 56 to computing device 32). In an embodiment, communication traffic generated by computing device 32 (e.g., by user 40 via computing device 32) may be transmitted to computing device 30, and computing device 30 may transmit the communication traffic to multipoint control unit 56 for forwarding to the participants of the multiparty communication session. In an embodiment, the communication traffic from computing device 32 may also be relayed from computing device 30 directly to computing device 28. As such, computing device 28 may receive the communication traffic generated by computing device 32 via computing device 28.

Elaborating on the above, in an embodiment relay process 10 may also relay 114 communication traffic for the multiparty communication session from the first computing device to the multipoint control unit by the second computing device. For example, in an embodiment, relay process 10 may provide bidirectional relaying of communication traffic for the first computing device. That is, relay process 10 may relay 104 communication traffic from the multipoint control unit to the first computing device via the second computing device, and may also relay 114 communication traffic from the first computing device to the multipoint control unit via the second computing device. As discussed above, in the event that the second computing device may be relaying communication traffic to other computing devices other than the first computing device, in some embodiments communication traffic from the first computing device may be relayed to such other computing devices directly from the second computing device (e.g., without first going through the multipoint control unit).

During the course of the multiparty communication session changes may occur in factors affecting the network. Accordingly, in some embodiments, relay process may dynamically monitor the network, devices associated with the multiparty communication session (e.g., computing devices associated with participants of the multiparty communication session, multipoint control units managing communication traffic, etc.), and/or attributes of devices associated with the multiparty communication session. Accordingly, relay process 10 may identify 116 a change in the network quality of service factor. Examples of changes in the network quality of service factor and/or causes of changes in the network quality of service factor may include, but are not limited to, changes in the second computer capacity (e.g., current CPU capacity, the number of computing device associated with the second computing device for receiving relayed communication traffic, and the like), the addition or removal of computing devices to the multiparty communication session, the addition or removal of multipoint control units to the multiparty communication session, changes to quality of service requirements associated with the participant operating the first computing device, and changes in quality of service factors associated with one or more of the networks involved in the multiparty communication session.

In an embodiment, in response to identifying 116 a change in the network quality of service factor that may make relaying 104 communication traffic from the multipoint control unit to the first computing device via the second computing device less desirable, relay process 10 may un-associate 118 the first computing device with the second computing device for relaying communication traffic from the multipoint control unit. Change in the network quality of service factor that may make relaying 104 communication traffic from the multipoint control unit to the first computing device via the second computing device may include, for example, a change by which an different connection arrangement may provide a higher quality of service for the first computing device and/or the multiparty communication session as a whole, that may result in the first computing device being unable to receive a required network quality of service (e.g., the role of first computing device may change from passive listening to active participating, etc.), and/or a change in the network quality of service factor that may allow a higher quality of service to be established for the first computing device (e.g., as a result of a change in network conditions, the addition of a multipoint control unit to which a satisfactory network connection may be established, the addition of another computing device that may serve as a better relaying computing device), or other change. Un-associating 118 the first computing device with the second computing device for relaying communication traffic from the multipoint control unit may result in communication traffic not longer being relayed 104 to the first computing device via the second computing device.

Figure 4:
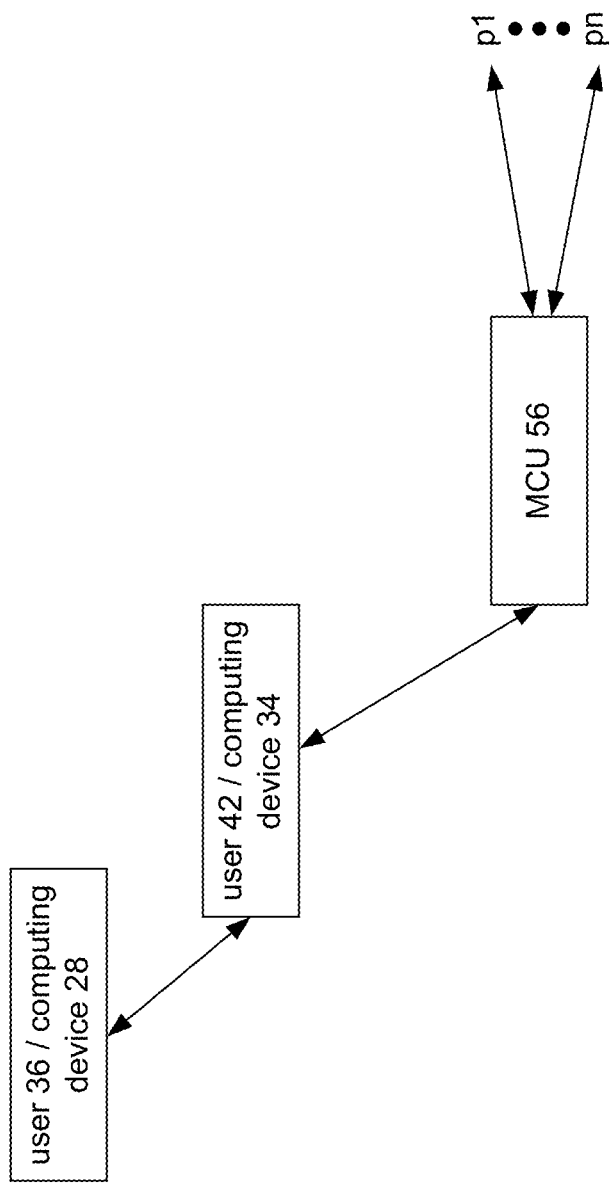
FIG. 4 is a diagrammatic representation of an example relay process of FIG. 1, according to an implementation of the present disclosure.

Further, relay process 10 may associate 120 the first computing device with a third computing device for the multiparty communication session. The third computing device may be participating in the multiparty communication session via the multipoint control unit. For example, relay process 10 may identify 116 a change in the network quality of service factor that may make relaying 104 communication traffic from multipoint control unit 56 to the computing device 28 via the computing device 30 less desirable (as discussed in detail above). Further, relay process 10 may un-associate 118 the computing device 28 with the computing device 30 for relaying communication traffic from the multipoint control unit. Referring also to FIG. 4, relay process 10 may associate 120 computing device 28 with computing device 34. Relay process 10 may associate 120 computing device 28 with computing device 34 based on analyzing a network quality of service factor for a network connection between the first computing device and the multipoint control unit, and analyzing a network quality of service factor for a network connection between the first computing device and the multipoint control unit via the third computing device, in a manner as generally described above with respect to the second computing device (e.g., computing device 30). In a generally corresponding manner, in some embodiments associating 120 the first computing device with the third computing device may be in response to identifying a preferred network quality of service criteria for the network connection between the first computing device and the multipoint control unit via the third computing device. Further, and in a generally similar manner as described above, relay process 10 may relay 122 communication traffic for the multiparty communication session from the multipoint control unit to the first computing device by the third computing device, and/or may relay 122 communication traffic from the first computing device to the multipoint control unit by the third computing device.

Figure 5:
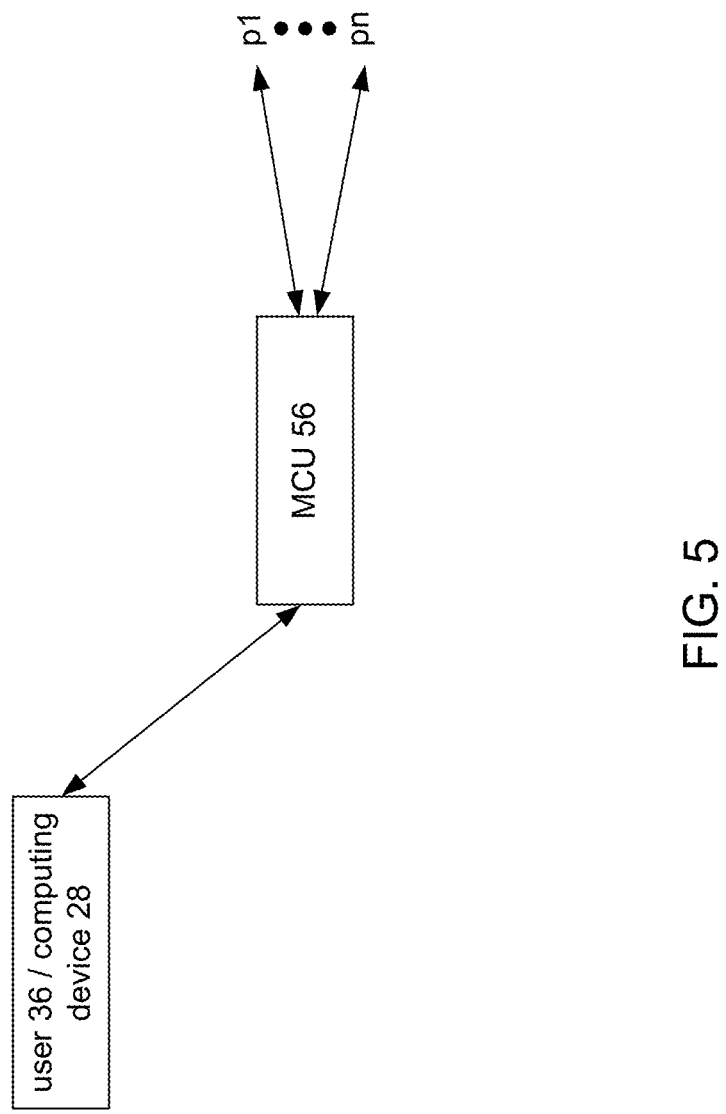
FIG. 5 is a diagrammatic representation of an example relay process of FIG. 1, according to an implementation of the present disclosure.

In some embodiments, relay process 10 may associate 124 the first computing device directly with the multipoint control unit device for the multiparty communication session. For example, relay process 10 may identify 116 a change in the network quality of service factor that may make relaying 104 communication traffic from multipoint control unit 56 to the computing device 28 via the computing device 30 less desirable (as discussed in detail above). Further, relay process 10 may un-associate 118 the computing device 28 with the computing device 30 for relaying communication traffic from the multipoint control unit. Referring also to FIG. 5, relay process 10 may associate 124 computing device 28 with multipoint control unit 54. Relay process 10 may associate 124 computing device 28 with multipoint control unit 54 based on analyzing a network quality of service factor for a network connection between the first computing device and the multipoint control unit, and analyzing a network quality of service factor for a network connection between the first computing device and the multipoint control unit via one or more computing device, in a manner as generally described above with respect to the second computing device (e.g., computing device 30). In a generally corresponding manner, in some embodiments associating 124 the first computing device directly with the multipoint control unit may be in response to identifying a preferred network quality of service criteria for the network connection between the first computing device and the multipoint control unit, directly. Further, and in a generally similar manner as described above, relay process 10 may relay 126 communication traffic for the multiparty communication session from the multipoint control unit directly to the first computing device (i.e., without relaying via another computing device utilized by a participant in the multiparty communication session for the purpose of participating in the multiparty communication session), and/or may relay 126 communication traffic from the first computing device directly to the multipoint control unit.

Figure 6:
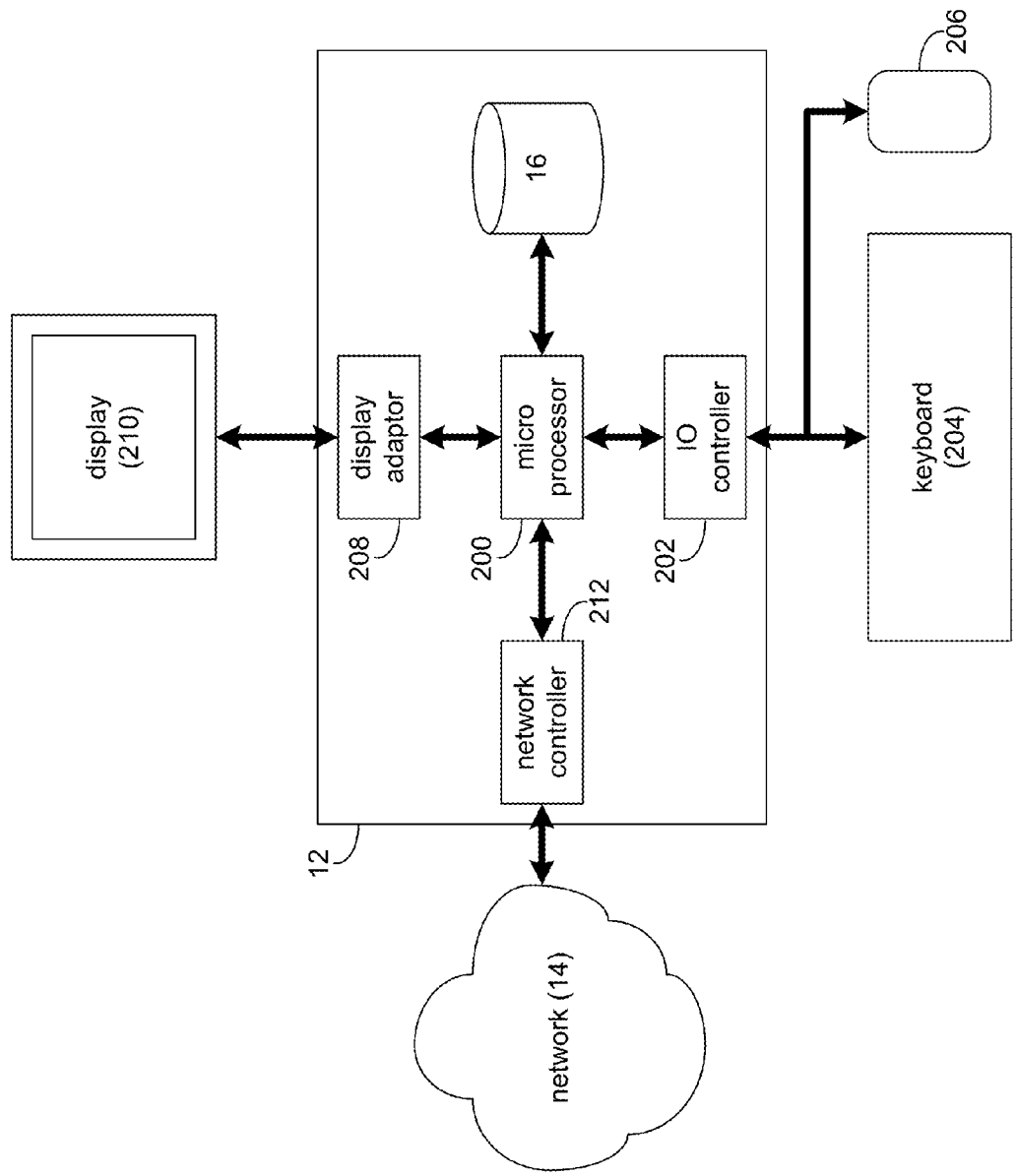
FIG. 6 is a diagrammatic view of the computing device of FIG. 1, according to an implementation of the present disclosure.

Referring also to FIG. 6, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, relay process 10 may be substituted for computing device 12 within FIG. 6, examples of which may include but are not limited to client electronic devices 28, 30, 32, 34.

Computing system 12 may include microprocessor 200 configured to e.g., process data and execute instructions/code for screen capture process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer program product comprising a non-transitory computer readable medium having a plurality of instructions stored thereon, which, when executed by a processor cause the processor to perform operations including:
   receiving a request from a first computing device to join a multiparty communication session;
   associating the first computing device with a second computing device for the multiparty communication session, the second computing device participating in the multiparty communication session via a multipoint control unit; and
   relaying communication traffic for the multiparty communication session from the multipoint control unit to the first computing device by the second computing device.

2. The computer program product of claim 1, further including instructions for:
   analyzing a network quality of service factor for a network connection between the first computing device and the multipoint control unit; and
   analyzing a network quality of service factor for a network connection between the first computing device and the multipoint control unit via the second computing device;
   wherein associating the first computing device with the second computing device is in response to identifying a preferred network quality of service criteria for the network connection between the first computing device and the multipoint control unit via the second computing device.

3. The computer program product of claim 1, further including instructions for:
   determining a network quality of service requirement of the first computing device.

4. The computer program product of claim 1, further including instructions for:

relaying communication traffic for the multiparty communication session from the first computing device to the multipoint control unit by the second computing device.

5. The computer program product of claim 1, further including instructions for:

identifying a change in the network quality of service factor; and un-associating the first computing device with the second computing device for relaying communication traffic from the multipoint control unit.

6. The computer program product of claim 5, further including instructions for:

associating the first computing device with a third computing device for the multiparty communication session, the third computing device participating in the multiparty communication session via the multipoint control unit; and relaying communication traffic for the multiparty communication session from the multipoint control unit to the first computing device by the third computing device.

7. The computer program product of claim 5, further including instructions for:

associating the first computing device directly with the multipoint control unit for the multiparty communication session; and relaying communication traffic for the multiparty communication session from the multipoint control unit directly to the first computing device.

8. A computing system comprising:

at least one processor device and at least one memory architecture coupled with the at least one processor device, the at least one processor device configured for:

receiving a request from a first computing device to join a multiparty communication session;

associating the first computing device with a second computing device for the multiparty communication session, the second computing device participating in the multiparty communication session via a multipoint control unit; and relaying communication traffic for the multiparty communication session from the multipoint control unit to the first computing device by the second computing device.

9. The computing system of claim 8, the at least one processor further configured for:

analyzing a network quality of service factor for a network connection between the first computing device and the multipoint control unit; and analyzing a network quality of service factor for a network connection between the first computing device and the multipoint control unit via the second computing device;

wherein associating the first computing device with the second computing device is in response to identifying a preferred network quality of service criteria for the network connection between the first computing device and the multipoint control unit via the second computing device.

10. The computing system of claim 8, the at least one processor further configured for:

relaying communication traffic for the multiparty communication session from the first computing device to the multipoint control unit by the second computing device.

11. The computing system of claim 8, the at least one processor further configured for:

identifying a change in the network quality of service factor; and un-associating the first computing device with the second computing device for relaying communication traffic from the multipoint control unit.

12. The computing system of claim 11, the at least one processor further configured for:

associating the first computing device with a third computing device for the multiparty communication session, the third computing device participating in the multiparty communication session via the multipoint control unit; and relaying communication traffic for the multiparty communication session from the multipoint control unit to the first computing device by the third computing device.

13. The computing system of claim 11, the at least one processor further configured for:

associating the first computing device directly with the multipoint control unit for the multiparty communication session; and relaying communication traffic for the multiparty communication session from the multipoint control unit directly to the first computing device.

* * * * *